(12) United States Patent
Schneider et al.

(10) Patent No.: US 9,569,605 B1
(45) Date of Patent: Feb. 14, 2017

(54) SYSTEMS AND METHODS FOR ENABLING BIOMETRIC AUTHENTICATION OPTIONS

(71) Applicant: Symantec Corporation, Mountain View, CA (US)

(72) Inventors: Scott Schneider, Sun Valley, CA (US); Brian T. Witten, Hermosa Beach, CA (US); Ramzi Abi Antoun, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 3 days.

(21) Appl. No.: 14/178,276

(22) Filed: Feb. 12, 2014

(51) Int. Cl.
*G06F 21/31* (2013.01)
*G06F 21/32* (2013.01)
*H04L 29/06* (2006.01)
*G06F 21/45* (2013.01)
*H04L 9/32* (2006.01)

(52) U.S. Cl.
CPC .............. *G06F 21/32* (2013.01); *G06F 21/31* (2013.01); *G06F 21/45* (2013.01); *H04L 9/3231* (2013.01); *H04L 63/0861* (2013.01)

(58) Field of Classification Search
CPC .......... G06F 21/31; G06F 21/32; G06F 21/45; G06F 21/316; H04L 63/0861; H04L 9/3231
See application file for complete search history.

(56) References Cited

U.S. PATENT DOCUMENTS

| 6,618,806 | B1* | 9/2003 | Brown | G06F 21/32 709/225 |
| 2004/0015243 | A1* | 1/2004 | Mercredi | G07C 9/00158 700/17 |
| 2006/0095789 | A1* | 5/2006 | Davis | G06F 21/316 713/186 |

(Continued)

OTHER PUBLICATIONS

Conti, Mauro et al., "Mind how you answer me!: transparently authenticating the user of a smartphone when answering or placing a call", ASIACCS '11 Proceedings of the 6th ACM Symposium on Information, Computer and Communications Security, Published by ACM, Hong Kong, China,(Mar. 22-24, 2011),249-259.

(Continued)

*Primary Examiner* — Morshed Mehedi
*Assistant Examiner* — Vance Little
(74) *Attorney, Agent, or Firm* — Fisherbroyles LLP

(57) ABSTRACT

A computer-implemented method for enabling biometric authentication options may include (1) identifying a device that includes a biometric authentication option that provides access to a protected feature of the device and that is based on a biometric trait and an initial authentication option that provides access to the protected feature and that is not based on the biometric trait, (2) detecting an authentication action that is performed by a user on the device that provides access to the protected feature via the initial authentication option, (3) capturing biometric data describing the biometric trait of (Continued)

the user in connection with the user performing the authentication action on the device, and (4) using the biometric data as training data for the biometric authentication option to enable the user to access the protected feature of the device via the biometric authentication option. Various other methods, systems, and computer-readable media are also disclosed.

18 Claims, 7 Drawing Sheets

(56) References Cited

U.S. PATENT DOCUMENTS

| | | | |
|---|---|---|---|
| 2007/0150747 A1* | 6/2007 | Mani | G06F 21/316 713/186 |
| 2009/0060293 A1* | 3/2009 | Nagao | G06F 21/32 382/118 |

OTHER PUBLICATIONS

Miller, Dan, "News from Voice Biometrics Conference-San Francisco: Voice Authentication Making Passwords Passe at Barclay's", http://opusresearch.net/wordpress/2013/05/08/news-from-voice-biometrics-conference-san-francisco-voice-authentication-making-passwords-passe-at-barclays/, as accessed Dec. 10, 2013, Opus Research, Inc., (May 8, 2013).

Miller, Dan, "A New Authentication Paradigm: Call Center Security without Compromising Customer Experience", http://opusresearch.net/wordpress/pdfreports/AuthinCareCenters_Victrio_May22_leadup.pdf, as accessed Dec. 10, 2013, Opus Research, Inc., (May 2013).

Li, Lingjun et al., "Unobservable Re-authentication for Smartphones", http://www.public.asu.edu/~ingjunl/papers/NDSS2013-Li.pdf, as accessed Dec. 10, 2013, NDSS'2013: ISOC Network and Distributed System Security Symposium, San Diego, CA, (Feb. 24-27, 2013).

"iPhone 5s: About Touch ID security", http://support.apple.com/kb/ht5949, as accessed Dec. 10, 2013, Apple Inc., (Sep. 23, 2013).

* cited by examiner

SYSTEMS AND METHODS FOR ENABLING BIOMETRIC AUTHENTICATION OPTIONS

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. Biometric authentication holds the possibility of creating security systems that are both strong and convenient. For example, swiping a fingerprint reader and speaking into a microphone are convenient actions for a user that are also very difficult for malicious actors to fake. However, when these actions fail due to false negatives, the resulting frustration can be enough to cause users to abandon the systems entirely.

Unfortunately, extensive training data is often required to reduce false negatives to a tolerable level for users. In addition, traditional systems for enabling biometric authentication may require users to guess when the system has received enough training data, causing frustration both for those users who enable the system too soon and must deal with false negatives and those users who delay in enabling the system and tediously enter more training data than needed. Traditional systems may also require a cumbersome set of steps to be completed before enabling the system, such as requiring users to dedicate a considerable length of time to producing training data. Accordingly, the instant disclosure identifies and addresses a need for additional and improved systems and methods for enabling biometric authentication options.

SUMMARY

As will be described in greater detail below, the instant disclosure generally relates to systems and methods for enabling biometric authentication options by capturing biometric data for authenticating to a device during normal usage of the device, including, e.g., during authentication actions on the device. In one example, a computer-implemented method for enabling biometric authentication options may include (1) identifying a device that includes (a) a biometric authentication option that provides access to a protected feature of the device and that is based on a biometric trait and (b) an initial authentication option that provides access to the protected feature of the device and that is not based on the biometric trait, (2) detecting an authentication action that is performed by a user on the device that provides access to the protected feature of the device via the initial authentication option, (3) capturing biometric data describing the biometric trait of the user in connection with the user performing the authentication action on the device, and (4) using the biometric data that describes the biometric trait as training data for the biometric authentication option to enable the user to access the protected feature of the device via the biometric authentication option.

The biometric data may be used as training data in a variety of ways. In some examples, using the biometric data that describes the biometric trait as training data may include (1) analyzing environmental conditions in which the biometric data was captured, (2) analyzing differences between the environmental conditions, (3) assessing a variability of the environmental conditions based on the differences, (4) determining that the variability of the environmental conditions meets a predetermined threshold, and (5) using the biometric data as training data based at least in part on the variability meeting the predetermined threshold.

Additionally or alternatively, using the biometric data as training data may include (1) dividing the biometric data into initial training data and testing data, (2) using the initial training data to train a biometric classifier for the biometric authentication option, (3) using the testing data to gauge accuracy of the biometric classifier against a predetermined threshold for accuracy, and (4) enabling the biometric authentication option based on the accuracy of the biometric classifier meeting the predetermined threshold for accuracy.

The biometric trait may be any or all of a variety of different possible traits. In one embodiment, the biometric trait may include a voice characteristic of the user recorded by an audio input on the device. In another embodiment, the biometric trait may include a facial characteristic of the user observed by a camera on the device. Additionally or alternatively, the biometric trait may include a fingerprint of the user observed by a fingerprint scanner on the device.

In one embodiment, the computer-implemented method may further include (1) identifying a secondary user of the device, (2) capturing additional biometric data describing an additional biometric trait of the secondary user, and (3) using the biometric authentication option to enable the secondary user to access an additional protected feature of the device but not the protected feature of the device.

Depending on the level of security required for the device, the biometric authentication option may replace or supplement the primary authentication option. In some examples, the computer-implemented method may further include replacing the initial authentication option with the biometric authentication option as a primary method of enabling the user to access the protected feature of the device in response to enabling the biometric authentication option. Additionally or alternatively, the computer-implemented method may further include requiring the biometric authentication option in addition to the initial authentication option to enable the user to access the protected feature of the device in response to enabling the biometric authentication option.

The process of enabling the biometric authentication option may be automatic and/or may include user input. In some examples, the computer-implemented method may further include notifying the user, in response to enabling the biometric authentication option, that the biometric authentication option has been enabled. Additionally or alternatively, the computer-implemented method may further include providing an input element, in response to enabling the biometric authentication option, that enables the user to select the biometric authentication option.

In one embodiment, a system for implementing the above-described method may include (1) an identification module, stored in memory, that identifies a device that includes (a) a biometric authentication option that provides access to a protected feature of the device and that is based on a biometric trait and (b) an initial authentication option that provides access to the protected feature of the device and that is not based on the biometric trait, (2) a detection module, stored in memory, that detects an authentication action that is performed by a user on the device that provides access to the protected feature of the device via the initial authentication option, (3) a capturing module, stored in memory, that captures biometric data describing the biometric trait of the user in connection with the user performing the authentication action on the device, (4) an enabling module, stored in memory, that uses the biometric data that describes the biometric trait as training data for the biometric authentication option to enable the user to access the protected feature of the device via the biometric authentication option, and (5) at least one physical processor configured to execute the identification module, the detection module, the capturing module, and the enabling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a device that includes (a) a biometric authentication option that provides access to a protected feature of the device and that is based on a biometric trait and (b) an initial authentication option that provides access to the protected feature of the device and that is not based on the biometric trait, (2) detect an authentication action that is performed by a user on the device that provides access to the protected feature of the device via the initial authentication option, (3) capture biometric data describing the biometric trait of the user in connection with the user performing the authentication action on the device, and (4) use the biometric data that describes the biometric trait as training data for the biometric authentication option to enable the user to access the protected feature of the device via the biometric authentication option.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
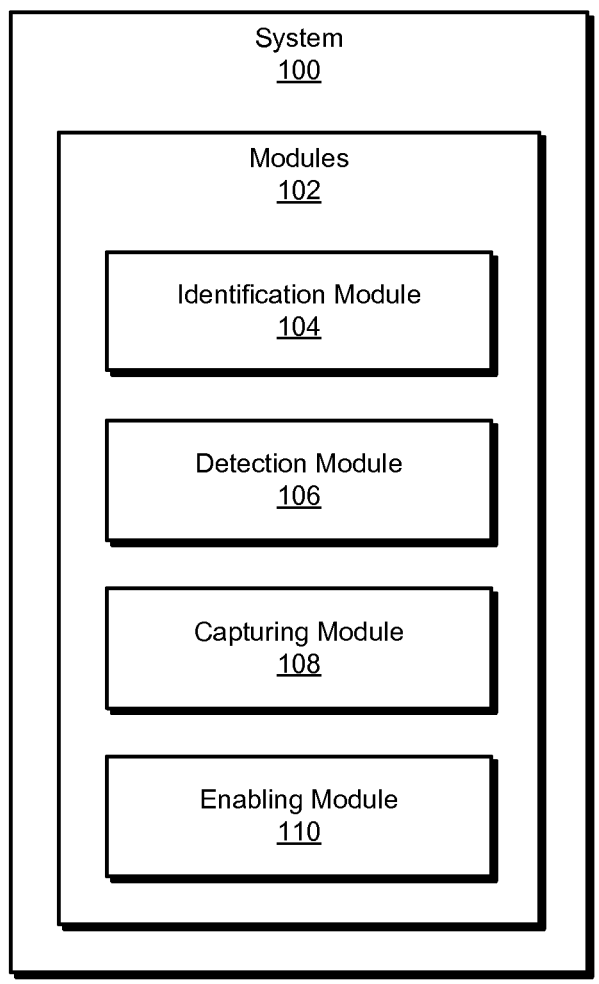
FIG. 1 is a block diagram of an exemplary system for enabling biometric authentication options.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling biometric authentication options. As will be explained in greater detail below, by capturing biometric data during normal usage of a device, a large and varied amount of biometric training data may be gathered without inconveniencing the user. In addition, by capturing this data in connection with an authentication action, the systems and methods described herein may ensure that the data almost certainly belongs to the user who is authenticating. Finally, enabling the biometric authentication option in this convenient way may increase the chance that the option will be used, which may in turn increase the security of the device.

Figure 2:
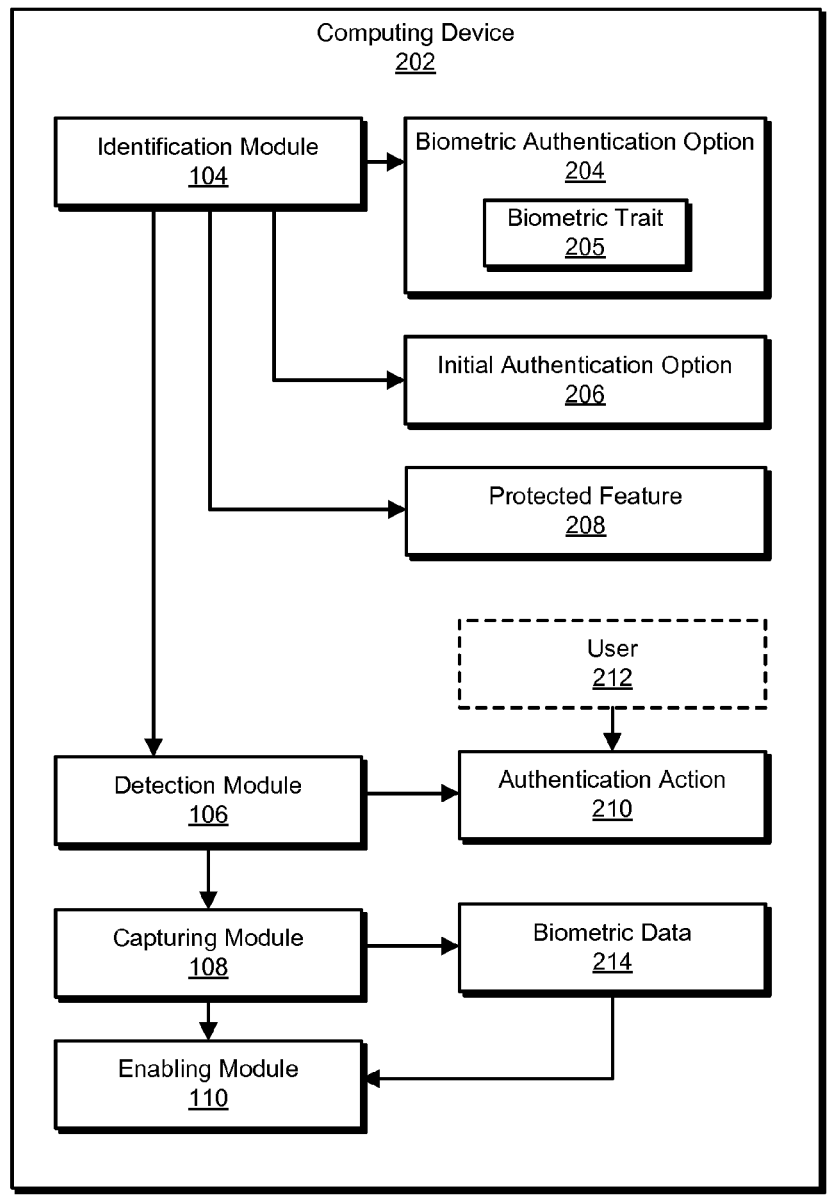
FIG. 2 is a block diagram of an additional exemplary system for enabling biometric authentication options.
Figure 3:
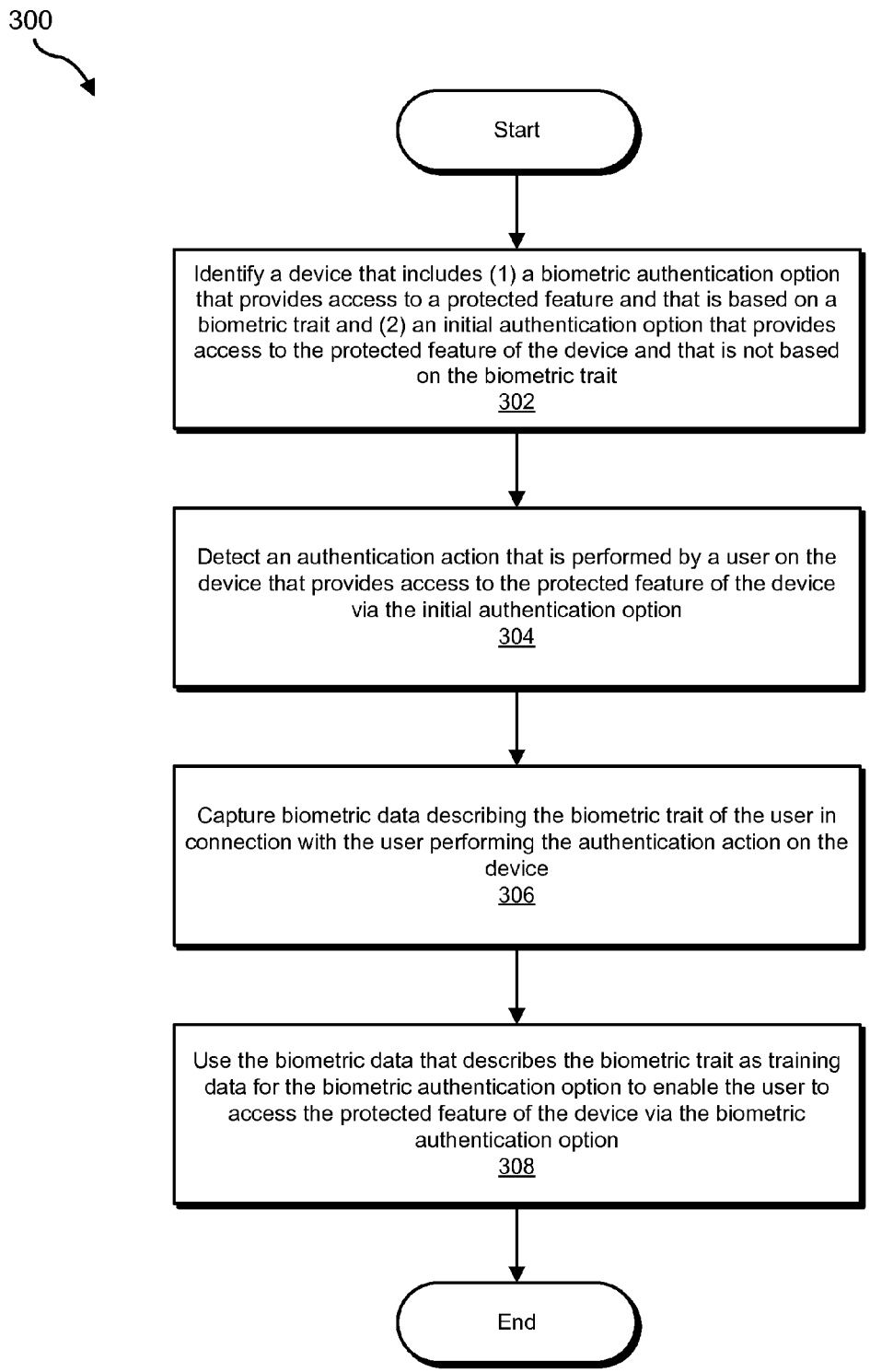
FIG. 3 is a flow diagram of an exemplary method for enabling biometric authentication options.
Figure 4:
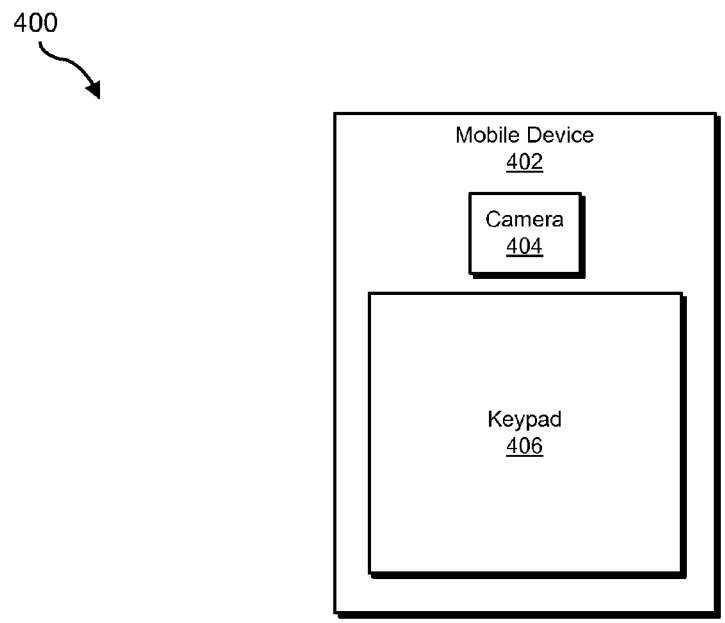
FIG. 4 is a block diagram of an exemplary computing system for enabling biometric authentication options.
Figure 4:
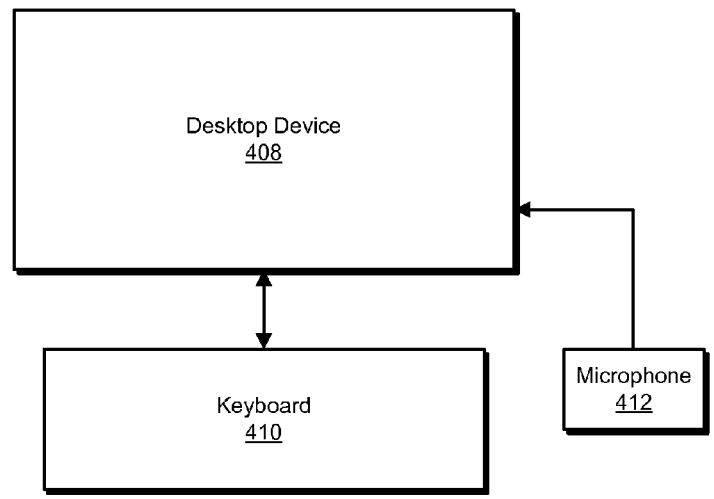

The following will provide, with reference to FIGS. 1, 2, and 4, detailed descriptions of exemplary systems for enabling biometric authentication options. Detailed descriptions of corresponding computer-implemented methods will also be provided in connection with FIG. 3 and FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for enabling biometric authentication options. As illustrated in this figure, exemplary system 100 may include one or more modules 102 for performing one or more tasks. For example, and as will be explained in greater detail below, exemplary system 100 may include an identification module 104 that may identify a device that includes both (1) a biometric authentication option that provides access to a protected feature and that is based on a biometric trait and (2) an initial authentication option that provides access to the protected feature of the device and that is not based on the biometric trait.

Exemplary system 100 may additionally include a detection module 106 that may detect an authentication action performed by a user on the device that provides access to the protected feature of the device via the initial authentication option. Exemplary system 100 may also include a capturing module 108 that may capture biometric data describing the biometric trait of the user in connection with the user performing the authentication action on the device. Exemplary system 100 may additionally include an enabling module 110 that may use the biometric data that describes the biometric trait as training data for the biometric authentication option to enable the user to access the protected feature of the device via the biometric authentication option. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to enable biometric authentication options. For example, and as will be described in greater detail below, identification module 104 may identify a computing device 202 that includes both (1) a biometric authentication option 204 that provides access to a protected feature 208 of computing device 202 and that is based on a biometric trait 205 and (2) an initial authentication option 206 that provides access to protected feature 208 of computing device 202 and that is not based on biometric trait 205. Next, detection module 106 may detect an authentication action 210 that is performed by a user 212 on computing device 202 that provides access to protected feature 208 of computing device 202 via initial authentication option 206. Once authentication action 210 has been detected, capturing module 108 may capture biometric data 214 describing biometric trait 205 of user 212 in connection with user 212 performing authentication action 210 on computing device 202. Finally, enabling module 110 may use biometric data 214 that describes biometric trait 205 as training data for biometric authentication option 204 to enable user 212 to access protected feature 208 of computing device 202 via biometric authentication option 204.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

FIG. 3 is a flow diagram of an exemplary computer-implemented method 300 for enabling biometric authentication options. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a device that includes both (1) a biometric authentication option that provides access to a protected feature and that is based on a biometric trait and (2) an initial authentication option that provides access to the protected feature of the device and that is not based on the biometric trait. For example, at step 302 identification module 104 may, as part of computing device 202 in FIG. 2, identify computing device 202 that includes both (1) biometric authentication option 204 that provides access to a protected feature 208 of computing device 202 and that is based on biometric trait 205 and (2) initial authentication option 206 that provides access to protected feature 208 of computing device 202 and that is not based on biometric trait 205.

Identification module 104 may identify the device in a variety of ways and contexts. For example, identification module 104 may identify the device by executing on the device. Additionally or alternatively, identification module 104 may identify the device by communicating with an authentication system on the device. In some examples, identification module 104 may identify the device in response to an authentication action being performed on the device. Additionally or alternatively, identification module 104 may identify the device in response to identification module 104 being installed on the device.

In one example, identification module 104 may identify a computing device with at least one biometric data capturing device that is integrated with and/or attached to the device. For example, identification module 104 may be part of a security system that identifies a mobile device with a fingerprint scanner and an authentication system that requires a personal identification number (PIN) code. In another example, identification module 104 may identify a desktop device with a camera and an authentication system that requires a password.

The phrase "protected feature," as used herein, generally refers to any feature of a device that may have restricted access. A protected feature of a device may require a user to be authenticated to the device in order to access the protected feature. In some examples, a protected feature may require additional authentication even for an authenticated user. Examples of protected features may include, without limitation, email applications, instant messaging applications, hardware features, and/or stored data. In some examples, accessing the protected feature may include logging in to the device. For example, the protected feature may be the portion of the device that requires authentication for access.

The phrase "authentication option," as used herein, generally refers to any mode of verifying and/or confirming the identity of a user. An authentication option may use a single authentication factor (such as a password) and/or may use multiple factors (such as a password and/or a code generated by a key fob). Examples of authentication options may include passwords, pass phrases, PINs, security questions, hyperlinks sent via email, security challenges, facial recognition, fingerprint recognition, voice recognition, and/or codes sent retrieved external devices.

The phrase "biometric trait," as used herein, typically refers to any physical characteristic and/or behavioral characteristic of a human. Examples of biometric traits that are physical characteristics may include facial characteristics, fingerprints, and/or retina scans. Examples of biometric traits that are behavioral characteristics may include voice characteristics and/or gestures.

At step 304, one or more of the systems described herein may detect an authentication action that is performed by a user on the device that provides access to the protected feature of the device via the initial authentication option. For example, at step 304 detection module 106 may, as part of computing device 202 in FIG. 2, detect authentication action 210 that is performed by user 212 on the device that provides access to the protected feature of the device via initial authentication option 206.

The phrase "authentication action," as used herein, generally refers to any action or set of actions taken by a user on an authentication option. An authentication action may be taken on a single authentication factor, such as typing in a password when prompted, or on multiple authentication factors, such as typing a password and also typing a code texted to a mobile device. In some examples, the authentication action may provide access to a single feature of the device, such as an email application. In other examples, the authentication action may authenticate the user to the device and/or may enable access to some or all of the features of the device. Examples of authentication actions may include typing a password and/or pass phrase, entering a PIN, clicking a hyperlink, answering security questions, completing security challenges, aiming a camera, swiping a fingerprint scanner, speaking into an audio receiver, and/or entering a code from an external device.

In some embodiments, an authentication action on the device may be triggered after the user has initially authenticated to the device. For example, a user who has unlocked a mobile device may have to re-authenticate in order to retrieve voicemail from the device. In another example, a user may have to perform an authentication action in order to make a purchase through a device. In some examples, the re-authentication action may be the same as the initial authentication action, for example, entering the same password. In other examples, the two authentication actions may be different, for example entering a PIN to unlock a mobile phone and then using a password to access an email application on the mobile phone.

Detection module 106 may detect the authentication action in a variety of ways and contexts. In some embodiments, detection module 106 may be a built in feature of the device that activates whenever an authentication action is performed. In other embodiments, detection module 106 may include a wrapper function that captures authentication actions. In one example, detection module 106 may detect that a user has logged in to a mobile device by entering a PIN. Additionally or alternatively, detection module 106 may communicate with an authentication system to detect the authentication action.

In some embodiments, detection module 106 may detect the authentication action after the authentication action has occurred. For example, detection module 106 may examine logs to determine when previous authentication actions have occurred and/or may correlate previously captured biometric data with authentication actions that occurred contemporaneously with the capture of the biometric data.

At step 306, one or more of the systems described herein may capture biometric data describing the biometric trait of the user in connection with the user performing the authentication action on the device. For example, at step 306 capturing module 108 may, as part of computing device 202 in FIG. 2, capture biometric data 214 describing biometric trait 205 of user 212 in connection with user 212 performing authentication action 210 on the device.

Capturing module 108 may capture the biometric data in a variety of ways. In some embodiments, capturing module 108 may include a hardware feature of the device, such as a fingerprint reader, an audio input, and/or a camera. In some embodiments, capturing module 108 may include a wrapper function that captures data from a hardware feature of the device.

In some examples, capturing module 108 may capture the biometric data after a successful authentication action. For example, capturing module 108 may capture a facial trait of the user of a mobile device by taking a picture of the user with the mobile device's camera immediately after the user has authenticated to an email application on the mobile device. In other examples, capturing module 108 may capture the biometric data before the authentication action and then discard biometric data associated with unsuccessful authentication actions. In some embodiments, capturing module 108 may store biometric data associated with unsuccessful authentication actions for the purposes of blacklisting the unauthenticated user from the device. Additionally or alternatively, capturing module 108 may capture the biometric data during the authentication action, by, for example, recording the voice of a user who is speaking a passphrase.

In some embodiments, capturing module 108 may also capture biometric data during normal usage of the device that does not include authentication actions. For example, capturing module 108 may capture the biometric data while the user is making voice calls, playing games, texting, using applications, and/or browsing the Internet (e.g., without the user having first performed an authentication action). In one example, an audio recorder may capture voice data while the user is making a voice call. In some embodiments, capturing module 108 may combine biometric data captured while the user is performing an authentication action with biometric data captured while the user is not performing an authentication action. For example, capturing module 108 may capture sufficient biometric data in connection with authentication actions to ensure that the biometric data corresponds to the user and capture additional biometric data not in connection with authentication actions in order to more quickly gather enough data for reliable biometric authentication.

The phrase "biometric data," as used herein, generally refers to any data describing a biometric trait. In some examples, the biometric data may be sufficient to uniquely identify the owner of the biometric trait. For example, the whorls of a fingerprint may uniquely identify the owner of the fingerprint. In other examples, the biometric data may only partially identify the owner of the biometric trait. For example, the acoustic patterns of a voice may identify the original speaker with 90% confidence but may also mistakenly identify members of the speaker's immediate family with 60% confidence.

In some embodiments, the device capturing the biometric data may be the same device as the device receiving the authentication action. Additionally or alternatively, the device capturing the biometric data may be a different device and/or a peripheral of the device receiving the authentication action. FIG. 4 is a block diagram of an exemplary computing system 400 for enabling biometric authentication options on devices with different input configurations. As illustrated in FIG. 4, a user may enter a PIN on keypad 406 of mobile device 402 and camera 404 on mobile device 402 may take a picture of the user's face. In another example, a user may enter a password for desktop device 408 by using keyboard 410, and then may have their voice recorded by microphone 412. Keyboard 410 and/or microphone 412 may be peripherals connected to desktop device 408. As illustrated in FIG. 4, the device capturing the biometric data may be situated relative to the device receiving the authentication action in such a way as to capture the biometric data during the authentication action.

Returning to FIG. 3, at step 308 one or more of the systems described herein may use the biometric data that describes the biometric trait as training data for the biometric authentication option to enable the user to access the protected feature of the device via the biometric authentication option. For example, at step 308 enabling module 110 may, as part of computing device 202 in FIG. 2, use biometric data 214 that describes biometric trait 205 as training data for biometric authentication option 204 to enable user 212 to access the protected feature of the device via biometric authentication option 204.

Enabling module 110 may enable the biometric authentication option in response to a variety of conditions. For example, enabling module 110 may enable the biometric authentication option automatically in response to the biometric training data meeting certain criteria and/or may present a user with the choice to enable the biometric authentication option.

In some examples, enabling module 110 may use the biometric data that describes the biometric trait as training data by (1) analyzing environmental conditions in which the biometric data was captured, (2) analyzing differences between the environmental conditions, (3) assessing a variability of the environmental conditions based on the differences, (4) determining that the variability of the environmental conditions meets a predetermined threshold, and (5) using the biometric data as training data based at least in part on the variability meeting the predetermined threshold. In some embodiments, the predetermined threshold may be based on the type of the device, the type of user, and/or the type of biometric data. For example, a mobile device using facial recognition may have a much higher threshold for environmental variability than a desktop device using facial recognition, because the mobile device must be able to recognize the user's face in a much wider range of lighting conditions, backgrounds, and/or camera angles. Additionally or alternatively, an enterprise user may have a higher threshold for environmental variability than a personal user because the enterprise user may have more stringent security requirements.

In another example, a device using a fingerprint scanner may have a very low threshold for environmental variability because the fingerprint scanner may be less affected by environmental conditions than voice or facial recognition systems. In some examples, the variability threshold may be based at least in part on specific conditions such as the location of the device, which may be determined by global positioning system coordinates and/or nearby networks. Examples of environmental conditions may include natural and/or artificial lighting, background noise, background objects, temperature, orientation of the device relative to the user and/or environment, humidity, and/or geographic location. For example, enabling module 110 may use the location of the device in an outdoor park and the time of day of 9 P.M. to determine that the camera may be capturing facial recognition data in low light conditions. In another example, enabling module 110 may use location of device as determined by the device's connection to a public wireless network to determine that the microphone may be capturing voice recognition data that may include significant background noise.

In some examples, enabling module 110 may use the biometric data as training data by (1) dividing the biometric data into initial training data and testing data, (2) using the initial training data to train a biometric classifier for the biometric authentication option, (3) using the testing data to gauge accuracy of the biometric classifier against a predetermined threshold for accuracy, and (4) enabling the biometric authentication option based on the accuracy of the biometric classifier meeting the predetermined threshold for accuracy. In some examples, the predetermined threshold may be based on a percentage of false positives identified among the testing data, percentage of false negatives, and/or a combination of the two. For example, enabling module 110 may enable the biometric authentication option based on the rate of false negatives from the testing data dropping below 3%.

The way in which the biometric option is used once enabled may vary based on the use case. In some examples, enabling module 110 may replace the initial authentication option with the biometric authentication option as a primary method of enabling the user to access the protected feature of the device in response to enabling the biometric authentication option. For example, a personal user of a mobile device with a biometric authentication option of facial recognition may use the facial recognition to authenticate to their device rather than entering a PIN.

Additionally or alternatively, enabling module 110 may require the biometric authentication option in addition to the initial authentication option to enable the user to access the protected feature of the device in response to enabling the biometric authentication option. Devices that require a higher level of security, such as those used by employees of a corporation, may be more likely to require multiple forms of authorization. For example, a user of a corporate desktop may be required by security policies to enter a password and to use the voice recognition authentication option of the desktop once voice recognition has been enabled. In some examples, the biometric authentication option may replace one or more parts of an authorization with multiple factors. For example, a user who formerly authenticated to a device using a pass phrase and a code generated by a key fob may instead authenticate to the device using the pass phrase and a fingerprint.

In some examples, enabling module 110 may conditionally enable the biometric authentication option to enhance security based on one or more contextual factors. For example, enabling module 110 may enable the biometric authentication option based on the location of the device, based on detecting a new user of the device, and/or based on identifying a predetermined number of failed attempts to authenticate to the device. In one example, enabling module 110 may enable the biometric authentication option in response to detecting that the device is in an unusual location and may have been stolen. Additionally or alternatively, enabling module 110 may enable the biometric authentication option in response to detecting potentially unauthorized use of the device.

Figure 5:
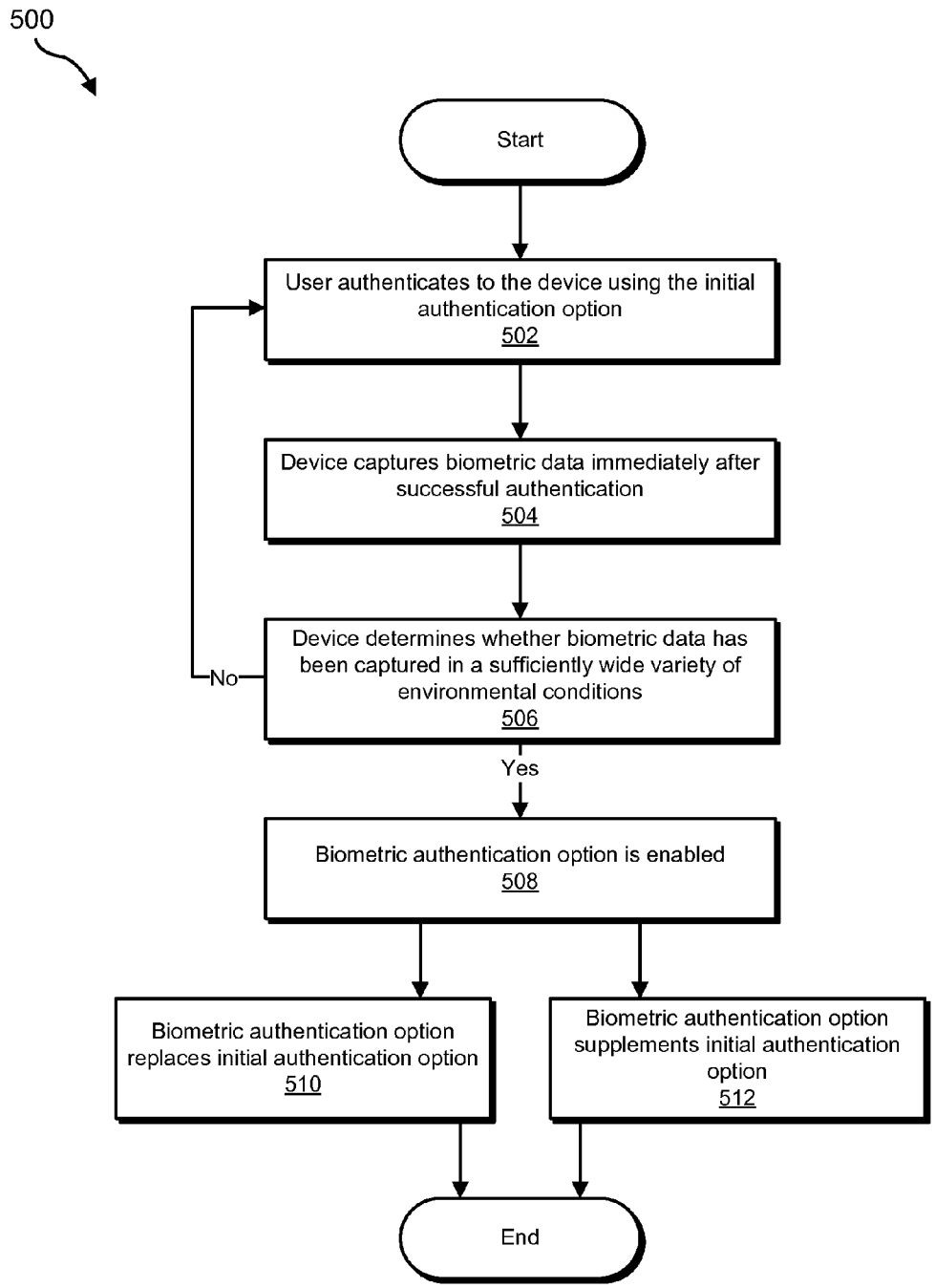
FIG. 5 is a flow diagram of an exemplary method for enabling biometric authentication options.

In some embodiments, the biometric system may go through multiple cycles of obtaining training and testing data before enabling module 110 enables the biometric authentication option. FIG. 5 is a block diagram of an exemplary computing system 500 for enabling biometric authentication options. At step 502, a user may authenticate to the device using the initial authentication option. The initial authentication option may be a username and password, PIN code, multi-factor authentication and/or a variety of other methods.

At step 504, the device may capture biometric data immediately after the successful authentication. For example, a mobile device may snap a picture of the user who has just successfully entered a PIN to unlock the device.

At step 506, the device may determine whether biometric data has been captured in a sufficiently wide variety of environmental conditions. If the device has not captured data in enough environmental conditions, the system returns to step 502 and continues capturing data until a threshold for environmental variety is met. If the device has captured a sufficient variety of data, the system continues to step 508.

At step 508, the biometric authentication option may be enabled. From there the device may either replace the initial authentication option as shown in step 510, or supplement the initial authentication option as shown in step 512. In some embodiments, the systems described herein may continue to gather biometric data after the biometric authentication option has been enabled in order to further improve the accuracy of the biometric authentication option.

In some examples, enabling module 110 may notify the user, in response to enabling the biometric authentication option, that the biometric authentication option has been enabled. For example, a mobile device may display an alert informing the user that they may now choose to authenticate with facial recognition rather than entering a password.

Additionally or alternatively, enabling module 110 may, in response to enabling the biometric authentication option, provide an input element that enables the user to select the biometric authentication option. For example, a device may display a dialog box allowing a user to choose whether to continue authenticating via a password or to instead authenticate via voice recognition.

In one embodiment, the systems described herein may (1) identify one or more secondary users of the device, (2) capture additional biometric data describing an additional biometric trait of the secondary user, and (3) use the biometric authentication option to enable the secondary user to access an additional protected feature of the device but not the protected feature of the device. In some examples, the secondary user may be identified via the initial authentication system. For example, the secondary user may log in to the device under a different username than the initial user. In other examples, the secondary user may be identified via the biometric authentication system. For example, the camera on the device may detect that the current user of the device has different facial characteristics than the primary user of the device.

In some embodiments, the biometric authentication system may enable the secondary user to access a lower level of permissions on the device than the primary user. For example, the secondary user may not be able to install software on the device. In addition, the systems described herein may prompt the primary user to set the secondary user's level of permissions at the primary user's next authentication after the secondary user has been detected.

In some embodiments, the systems described herein may share biometric data between devices to enable biometric authentication on multiple devices. For example, a user with profiles on both a mobile device and a desktop device may authenticate to both devices via voice recognition. In this example, the systems described herein may have trained the voice recognition system using voice data collected primarily from the mobile device. In another example, a user may be able to authenticate to any of the desktop devices on a corporate network by using a fingerprint scanner. In this example, the systems described herein may have collected the fingerprint data primarily from the desktop in the user's office.

As explained above in connection with method 300 in FIG. 3, the systems described herein may identify a device that includes at least two authentication options, at least one of which is based on a biometric trait. The authentication options may log the user into the device, provide access to specific features of the device, and/or some combination of the above. The biometric trait may be a facial characteristic of the user, a voice characteristic of the user, a fingerprint of the user, and/or any other trait of the user.

The systems described herein may capture biometric data describing the biometric trait in connection with an authentication action performed by the user. For example, the authentication action may be the user unlocking or logging into the device and/or it may be an action performed during normal use of the device, such as logging into an email application or making an online purchase.

Biometric data captured in this way may be used as training data for the biometric authentication option. Once training data has been collected in a large enough variety of environmental conditions to ensure sufficient accuracy for the biometric authentication option, the biometric authentication option may be enabled. This may take place automatically or the user may be given the choice to enable the biometric authentication option. Depending on the level of security required for the device, the biometric authentication option may replace and/or supplement existing authentication options.

By passively collection biometric data during normal usage of the device, the systems described herein may build up a large library of training data without inconveniencing users. Allowing users the option to enable accurate biometric authentication without going through a lengthy manual set up process may increase the chance that users will use the biometric authentication options available on their devices, which may increase both security and convenience for users.

Figure 6:
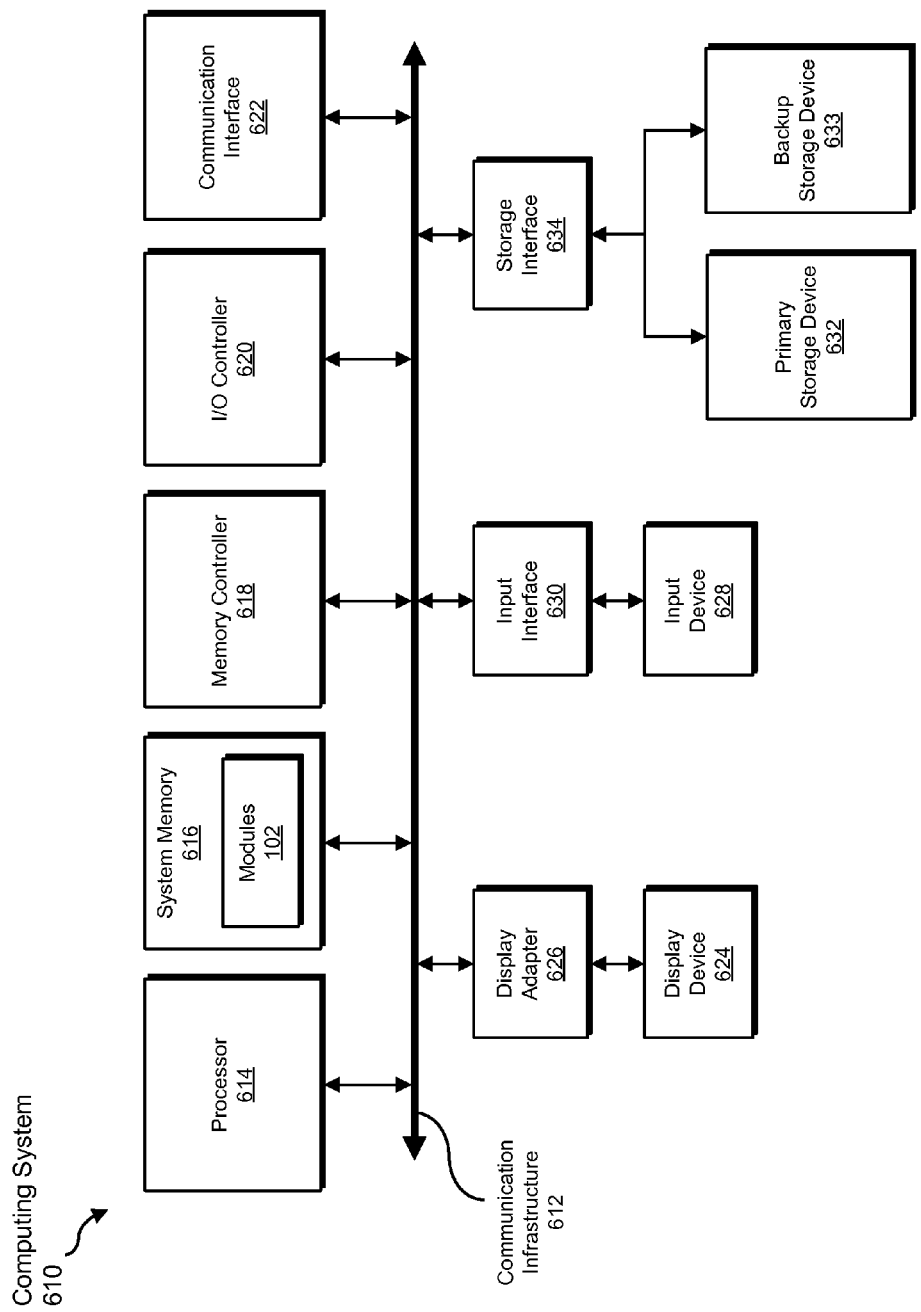
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
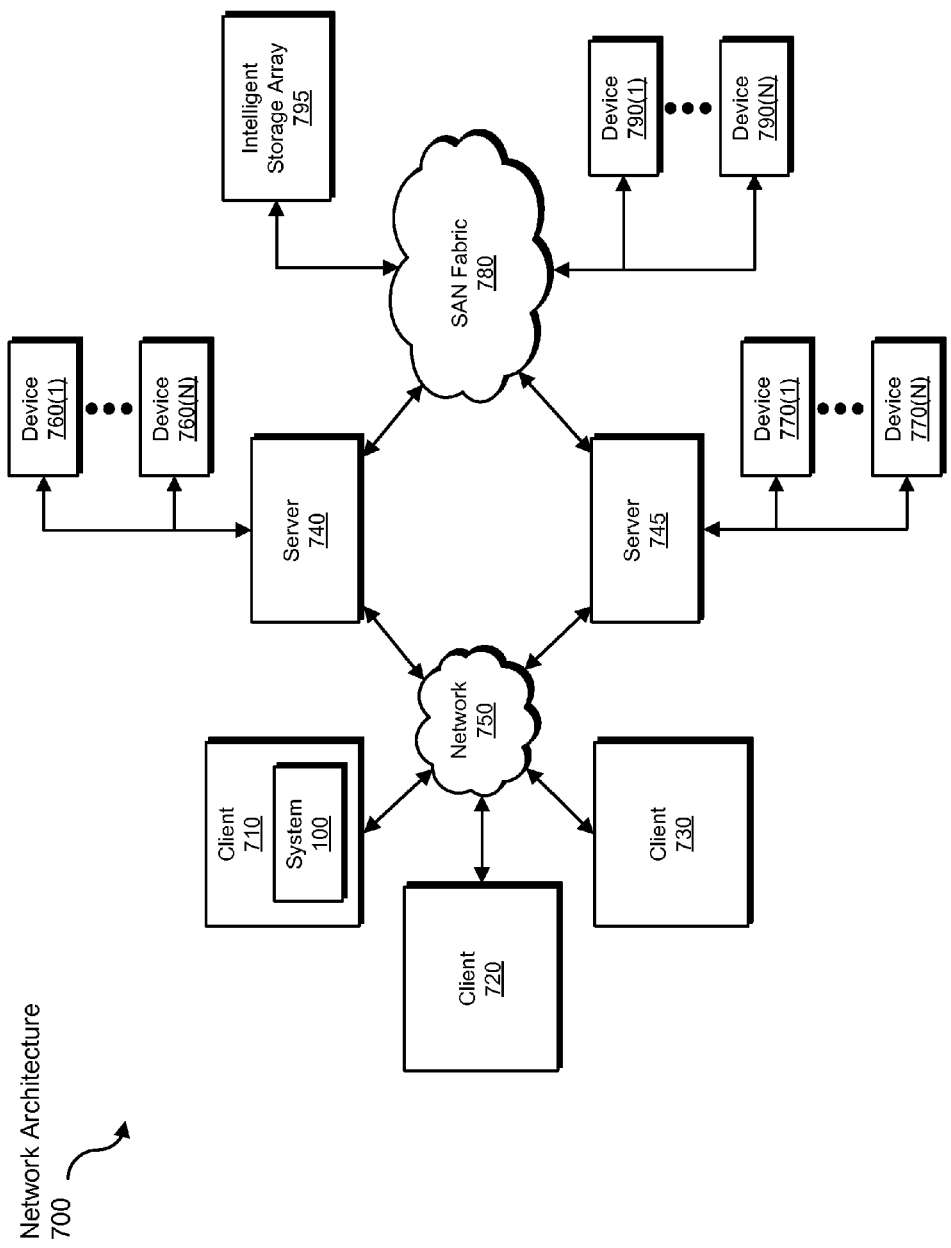
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enabling biometric authentication options.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive biometric data to be transformed, transform the biometric data, output a result of the transformation to a database, use the result of the transformation to train a biometric authentication option, and store the result of the transformation to an authentication system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method for enabling biometric authentication options, at least a portion of the method being performed by a computing device comprising at least one processor, the method comprising: identifying a device that comprises: a biometric authentication option that provides access to a protected feature of the device and that is based on a biometric trait; and an initial authentication option that provides access to the protected feature of the device and that is not based on the biometric trait; detecting an authentication action that is performed by a user on the device that provides access to the protected feature of the device via the initial authentication option; capturing, automatically and in response to detecting the authentication action, and for use as training data for the biometric authentication option based on the user performing the authentication action successfully, biometric data describing the biometric trait as observed from the user in connection with the user performing the authentication action on the device; and using the biometric data that describes the biometric trait as observed from the user as training data for the biometric authentication option to automatically enable the user to access the protected feature of the device via the biometric authentication option and independently from the initial authentication option; wherein using the biometric data that describes the biometric trait as training data comprises: analyzing environmental conditions in which the biometric data was captured; analyzing differences between the environmental conditions; assessing a variability of the environmental conditions based on the differences; determining that the variability of the environmental conditions meets a predetermined threshold; using the biometric data as training data based at least in part on the variability meeting the predetermined threshold.

2. The computer-implemented method of claim 1, wherein using the biometric data as training data comprises:
dividing the biometric data into initial training data and testing data;
using the initial training data to train a biometric classifier for the biometric authentication option;
using the testing data to gauge accuracy of the biometric classifier against a predetermined threshold for accuracy;
enabling the biometric authentication option based on the accuracy of the biometric classifier meeting the predetermined threshold for accuracy.

3. The computer-implemented method of claim 1, wherein the biometric trait comprises a voice characteristic of the user recorded by an audio input on the device.

4. The computer-implemented method of claim 1, wherein the biometric trait comprises a facial characteristic of the user observed by a camera on the device.

5. The computer-implemented method of claim 1, wherein the biometric trait comprises a fingerprint of the user observed by a fingerprint scanner on the device.

6. The computer-implemented method of claim 1, further comprising:
identifying a secondary user of the device;
capturing additional biometric data describing an additional biometric trait of the secondary user;
using the biometric authentication option to enable the secondary user to access an additional protected feature of the device but not the protected feature of the device.

7. The computer-implemented method of claim 1, further comprising replacing the initial authentication option with the biometric authentication option as a primary method of enabling the user to access the protected feature of the device in response to enabling the biometric authentication option.

8. The computer-implemented method of claim 1, further comprising requiring the biometric authentication option in addition to the initial authentication option to enable the user to access the protected feature of the device in response to enabling the biometric authentication option.

9. The computer-implemented method of claim 1, further comprising notifying the user, in response to enabling the biometric authentication option, that the biometric authentication option has been enabled.

10. The computer-implemented method of claim 1, further comprising providing an input element, in response to enabling the biometric authentication option, that enables the user to select the biometric authentication option.

11. A system for enabling biometric authentication options, the system comprising: an identification module, stored in memory, that identifies a device that comprises: a biometric authentication option that provides access to a protected feature of the device and that is based on a biometric trait; and an initial authentication option that provides access to the protected feature of the device and that is not based on the biometric trait; a detection module, stored in memory, that detects an authentication action that is performed by a user on the device that provides access to the protected feature of the device via the initial authentication option; a capturing module, stored in memory, that captures, automatically and in response to detecting the authentication action, and for use as training data for the biometric authentication option based on the user performing the authentication action successfully, biometric data describing the biometric trait as observed from the user in connection with the user performing the authentication action on the device; an enabling module, stored in memory, that uses the biometric data as observed from the user that describes the biometric trait as training data for the biometric authentication option to automatically enable the user to access the protected feature of the device via the biometric authentication option and independently from the initial authentication option; and at least one physical processor configured to execute the identification module, the detection module, the capturing module, and the enabling module; wherein the enabling module uses the biometric data that describes the biometric trait as training data by: analyzing environmental conditions in which the biometric data was captured; analyzing differences between the environmental conditions; assessing a variability of the environmental conditions based on the differences; determining that the variability of the environmental conditions meets a predetermined threshold; using the biometric data as training data based at least in part on the variability meeting the predetermined threshold.

12. The system of claim 11, wherein the enabling module uses the biometric data as training data by:
dividing the biometric data into initial training data and testing data;
using the initial training data to train a biometric classifier for the biometric authentication option;
using the testing data to gauge accuracy of the biometric classifier against a predetermined threshold for accuracy;

enabling the biometric authentication option based on the accuracy of the biometric classifier meeting the predetermined threshold for accuracy.

13. The system of claim 11, wherein the biometric trait comprises a voice characteristic of the user recorded by an audio input on the device.

14. The system of claim 11, wherein the biometric trait comprises a facial characteristic of the user observed by a camera on the device.

15. The system of claim 11, wherein the biometric trait comprises a fingerprint of the user observed by a fingerprint scanner on the device.

16. The system of claim 11, wherein:
the identification module further identifies a secondary user of the device;
the capturing module further captures additional biometric data describing an additional biometric trait of the secondary user;
the enabling module further uses the biometric authentication option to enable the secondary user to access an additional protected feature of the device but not the protected feature of the device.

17. The system of claim 11, wherein the enabling module further replaces the initial authentication option with the biometric authentication option as a primary method of enabling the user to access the protected feature of the device in response to enabling the biometric authentication option.

18. A non-transitory computer-readable medium comprising one or more computer-readable instructions that, when executed by at least one processor of a computing device, cause the computing device to: identify a device that comprises: a biometric authentication option that provides access to a protected feature of the device and that is based on a biometric trait; and an initial authentication option that provides access to the protected feature of the device and that is not based on the biometric trait; detect an authentication action that is performed by a user on the device that provides access to the protected feature of the device via the initial authentication option; capture, automatically and in response to detecting the authentication action, and for use as training data for the biometric authentication option based on the user performing the authentication action successfully, biometric data describing the biometric trait of as observed from the user in connection with the user performing the authentication action on the device; and use the biometric data that describes the biometric trait as observed from the user as training data for the biometric authentication option to enable the user to automatically access the protected feature of the device via the biometric authentication option and independently from the initial authentication option; wherein use the biometric data that describes the biometric trait as training data comprises: analyze environmental conditions in which the biometric data was captured; analyze differences between the environmental conditions; assess a variability of the environmental conditions based on the differences; determine that the variability of the environmental conditions meets a predetermined threshold; use the biometric data as training data based at least in part on the variability meeting the predetermined threshold.

* * * * *